United States Patent [19]

Suzuki et al.

[11] Patent Number: 4,589,118

[45] Date of Patent: May 13, 1986

[54] METHOD OF OPTICAL PUMPING OF ERBIUM-DOPED LASER MATERIAL AND APPARATUS THEREFOR

[75] Inventors: Teiichi Suzuki; Tetsuro Izumitani, both of Tokyo, Japan

[73] Assignee: Hoya Corporation, Tokyo, Japan

[21] Appl. No.: 709,816

[22] Filed: Mar. 8, 1985

[30] Foreign Application Priority Data

Mar. 9, 1984 [JP] Japan .................. 59-43790

[51] Int. Cl.$^4$ ........................................... H01S 3/091
[52] U.S. Cl. ...................... 372/71; 372/69; 372/70; 372/41; 372/92
[58] Field of Search ............... 372/41, 39, 92, 68–72, 372/93, 97

Primary Examiner—Léon Scott, Jr.
Attorney, Agent, or Firm—Cushman, Darby & Cushman

[57] ABSTRACT

A method of optical pumping of an erbium laser and an apparatus therefor with an erbium laser medium, a light source for side-pumping the erbium laser medium, a neodymium laser medium for emitting a laser beam upon optical pumping by the light source, and an optical system for directing the laser beam from the neodymium laser medium to the erbium laser medium for side-pumping the erbium laser medium. Thus the erbium laser medium is side-pumped by the light source and also end-pumped by the laser beam emitted from the neodymium laser medium side-pumped at the same time by the light source in the same lamp house. Therefore the erbium laser can be optically pumped with high efficiency and offer a low threshold value.

4 Claims, 1 Drawing Figure

U.S. Patent May 13, 1986 4,589,118
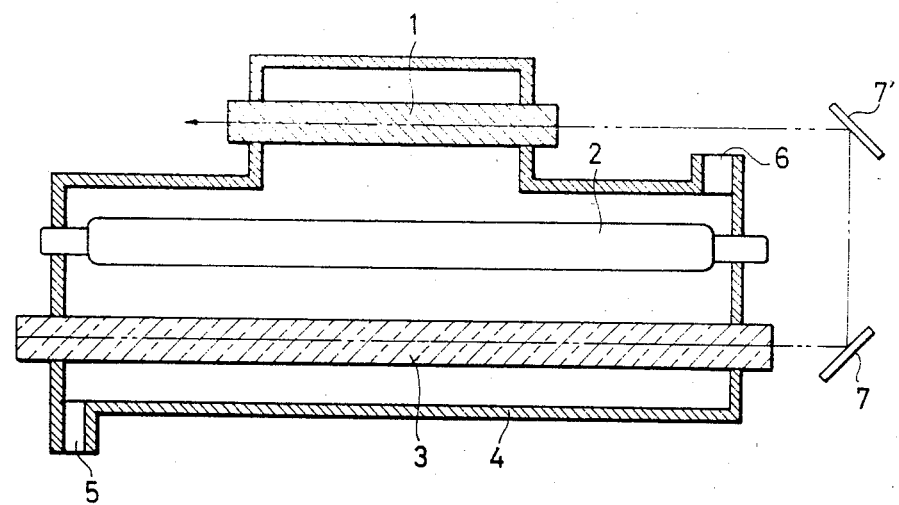

METHOD OF OPTICAL PUMPING OF ERBIUM-DOPED LASER MATERIAL AND APPARATUS THEREFOR

FIELD OF THE INVENTION

The present invention relates to the method of optical pumping of an erbium laer material and apparatus for use therein.

BACKGROUND OF THE INVENTION

An erbium glass laser which has a wavelength of 1.54 $\mu$m has recently received increasing attention since its wavelength corresponds to the safety region for the human eyes and also to the minimum loss region of quartzbased optical fibers.

An erbium laser is, of course, produced by the glass doped with erbium ions. Such a laser glass doped with erbium ions alone, however, fails to achieve a low threshold oscillation. Therefore it is further doped with an ytterbium ion as a sensitizer. The ytterbium ions absorb the radiation having a wavelength of 1 $\mu$m emitted from a flash lamp, and the energy thus absorbed by ytterbium ions is non-radiatively transferred to the erbium ions, whereupon a laser emission of a wavelength of 1.54 $\mu$m from the erbium ions is obtained. In this case, however, only the radiation of wavelength of 1 $\mu$m emitted from the flash lamp is utilized for optical pumping and, therefore, the efficiency of the laser oscillation is very low and the threshold value of that is high. Thus such a laser is impractical for most uses.

However, the glass doped additionally with neodymium ions having a strong absorption band in visible resion permits more efficient utilization of the radiation from a flash lamp than the laser glass doped only with Er and Yb. Furthermore, by the mission of wavelength of 1.06 $\mu$m from Nd ions that the ytterbium ions can absorb as pumping light, the efficiency is increased and the threshold value of oscillation is decreased.

Some problems, however, occur in doping a single glass with erbium, ytterbium, and neodymium ions. For example, if the neodymium ions are added in a proportion of 0.05% or more, a reversal phenomenon occurs, causing the energy to return from the erbium ion to the neodymium ion. Thus it is necessary to lower the proportion of neodymium ions to less than 0.05%. On the other hand, if the neodymium ion content is not more than 0.2%, a laser beam having a wavelength of 1.06 $\mu$m is not emitted. Thus, such an attempt to dope glass with erbium, ytterbium and neodymium ions that the neodymium ions absorb light beams, having a wavelength in the vicinity of 0.55 $\mu$m, emitted from a flash lamp, the ytterbium ions absorb a laser beam of wavelength of 1.06 $\mu$m, and a laser beam having a wavelength of 1.54 $\mu$m from the erbium ions is oscillated has met with little success. In fact the oscillation efficiency is only about 0.1%.

SUMMARY OF THE INVENTION

An object of the present invention is to provide a method of optical pumping of an erbium laser whereby light energy from an excitation light source is utilized effectively and a laser beam of wavelength of 1.54 $\mu$m is emitted with high efficiency.

Another object of the present invention is to provide an apparatus for optical pumping of an erbium laser.

Other objects and advantages of the present invention will become apparent from the following explanation.

The present invention relates to:

(1) a method of optical pumping of an erbium laser which comprises side-pumping of an erbium laser medium by means of a light source while at the same time end-pumping of the erbium laser medium with a laser beam from a neodymium laser medium, the laser beam thereof being emitted through optical pumping of the neodymium laser medium by the light source; and (2) an apparatus for optical pumping of an erbium laser medium with comprises:

an erbium-doped laser medium;

an excitation light source which is used to sidepump the erbium laser medium;

a neodymium laser medium to emit a laser beam through optical pumping by the light source; and an optical system designed so that the laser beam from the neodymium laser medium is used to end-pump the erbium laser medium.

BRIEF DESCRIPTION OF THE DRAWING

The FIGURE is a schematic diagram illustrating an embodiment of the present invention in which:

1 ... Erbium laser medium, 2 ... Flash lamp, 3 ... Neodymium laser medium, 4 ... Lamp house, 5 ... Cooling medium inlet, 6 ... Cooling medium outlet, 7, 7' ... Mirrors.

DETAILED DESCRIPTION OF THE INVENTION

Referring to the FIGURE, there is shown a schematic diagram of an apparatus of the present invention. An erbium laser medium 1 is a glass laser rod containing erbium ions as activators and ytterbium ions as sensitizers. The erbium laser medium 1 is provided with a vacuum deposited film half-transmittable to light having a wavelength of 1.54 $\mu$m at the left end thereof, and with a vacuum deposited film totally reflectable to light having a wavelength of 1.54 $\mu$m but transmittable to light having a wavelength of 1.06 $\mu$m at the right end thereof. Light source 2 is a bar-like flash lamp. A neodymium laser medium 3 is a glass laser rod containing neodymium ions, which is provided with a vacuum deposited film totally reflective to light having a wavelength of 1.06 $\mu$m at the left end thereof, and with a vacuum deposited film half-transmittable to light having a wavelength of 1.06 $\mu$m at the right end thereof. The erbium laser medium 1, the flash lamp 2 and the neodymium laser medium 3 are placed in parallel to each other in a container-like lamp house 4. The inner surfaces of the lamp house 4 are made totally reflective for effective radiation of the erbium laser medium 1 and the neodymium laser medium 3 with light from the flash lamp 2. The lamp house 4 is provided with a cooling medium inlet 5 and a cooling medium outlet 6, so that it is effectively cooled with a cooling medium coming through the inlet 5 and going out through the outlet 5.

A laser beam emitted from the neodymium laser medium 3 is guided by means of an optical system including mirrors 7 and 7' to the erbium laser medium 1 for the purpose of end-pumping of the erbium laser medium 1. These mirrors 7 and 7' are provided outside the lamp house 4 in one body by a suitable means (not shown).

An erbium laser is a three-level laser and thus it is necessary to increase excitation density. On the other hand, a neodymium laser is a four-level laser and, therefore, it is desirable that the length of the erbium laser medium 1 be shorter than that of the neodymium laser medium 3. For example, if the neodymium laser medium 3 is a rod made of LHG8 (neodymium-containing phosphate laser glass manufactured by HOYA CORPORATION) measuring 3-4 mm in diameter and 60 mm in length, it is suitable that the erbium laser medium 1 be 3 mm in diameter and 4-10 mm in length.

A radiation having a wavelength of approximately 1.0 $\mu$m emitted from the flash lamp 2 is absorbed by ytterbium ions contained in the erbium laser medium 1, resulting in the excitation of the erbium laser medium through side-pumping. On the other hand, radiation having a wavelength in the vicinity of 0.55. $\mu$m in light emitted from the flash lamp 2 are absorbed by the neodymium laser medium 3. As a result, the neodymium laser medium 3 is side-pumped, thereby emitting a laser beam having a wavelength of 1.06 $\mu$m. This laser light is guided by the mirrors 7 and 7' to the erbium laser medium 1, where it is absorbed by the ytterbium ions, resulting in the excitation of the erbium laser medium 1 through end-pumping. Therefore, of the light emitted from the flash lamp 2, radiation of wavelength of 1.0 $\mu$m is absorbed by the ytterbium ions directly and radiation of wavelength of near 0.55 $\mu$m absorbed by the medium ions. Both wavelengths are thus utilized for optical pumping of the erbium laser. That is, the simultaneous excitations through the side and end surfaces result in oscillation for an erbium laser light of wavelength of 1.54 $\mu$m with high efficiency and at a low threshold value.

When the erbium laser medium 1 does not contain ytterbium ions, side pumping due to the flash lamp 2 becomes difficult. However, end-pumping due to the laser light from the neodymium laser medium 3 may be attained. A YAG laser oscillating at the same wavelength can be used as the neodymium laser medium 3.

The present invention produces various advantages. One of the advantages is that the energy from the light source can be utilized with high efficiency and, therefore, an erbium laser beam having a wavelength of 1.54 $\mu$m can be emitted with high efficiency and further at a low threshold value. Another advantage is that the apparatus of the present invention can be designed in a compact form and further is easy to handle.

What is claimed is:

1. A method of optical pumping of an erbium laser medium which comprises side-pumping an erbium laser medium by means of excitation by a light source while at the same time end-pumping the erbium laser medium with a laser beam from a neodymium laser medium, said laser beam being emitted by optical pumping of the neodymium laser medium with said light source.

2. The method as claimed in claim 1, wherein the erbium laser medium contains ytterbium ions as a sensitizer.

3. An apparatus for optical pumping of an erbium laser material which comprises:
   a housing;
   an erbium laser medium mounted inside said housing;
   a neodymium laser medium mounted inside said housing;
   a light source means mounted inside said housing for excitation of said erbium laser medium to side-pump the erbium laser medium and for optical pumping of said neodymium laser medium to emit a laser beam; and
   an optical means for directing the laser beam from the neodymium laser medium to said erbium laser medium to end-pump the erbium laser medium.

4. The apparatus as claimed in claim 3, wherein the erbium laser medium contains ytterbium ions as a sensitizer.

* * * * *